United States Patent
Yamamoto

(10) Patent No.: US 9,595,906 B2
(45) Date of Patent: Mar. 14, 2017

(54) MOTOR CONTROL APPARATUS HAVING FUNCTION FOR PROTECTING LCL FILTER

(71) Applicant: FANUC CORPORATION, Yamanashi (JP)

(72) Inventor: Kenta Yamamoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/865,024

(22) Filed: Sep. 25, 2015

(65) Prior Publication Data

US 2016/0094179 A1    Mar. 31, 2016

(30) Foreign Application Priority Data

Sep. 26, 2014    (JP) .................................. 2014-197587

(51) Int. Cl.
*H02H 7/00*    (2006.01)
*H02P 27/06*    (2006.01)
*H02P 29/02*    (2016.01)

(52) U.S. Cl.
CPC ............. *H02P 27/06* (2013.01); *H02P 29/021* (2013.01); *H02P 29/60* (2016.02)

(58) Field of Classification Search
CPC ......... H02P 27/06; H02P 29/021; H02P 29/60
USPC ..... 318/400.21, 400.26, 739, 764, 641, 479, 318/504; 363/40, 124, 142, 125, 37
See application file for complete search history.

(56) References Cited

U.S. PATENT DOCUMENTS

| 7,599,196 B2 * | 10/2009 | Alexander | H02M 3/1582 363/124 |
| 7,778,045 B2 * | 8/2010 | Alexander | H02M 3/1582 363/124 |
| 8,310,848 B2 * | 11/2012 | Sakakibara | H02M 1/32 363/34 |
| 8,450,961 B2 * | 5/2013 | Sakakibara | H02M 1/4216 318/479 |

(Continued)

FOREIGN PATENT DOCUMENTS

| JP | 2006288161 A | 10/2006 |
| JP | 2013138561 A | 7/2013 |
| JP | 2015106948 A | 6/2015 |

OTHER PUBLICATIONS

English Abstract and Machine Translation for Japanese Publication No. 2015106849 A, published Jun. 8, 2015,14 pgs.

(Continued)

*Primary Examiner* — Rita Leykin
(74) *Attorney, Agent, or Firm* — Fredrikson & Byron, P.A.

(57) ABSTRACT

A motor control apparatus includes: a PWM rectifier which converts an AC power to a DC power; an LCL filter provided between the AC power supply and the PWM rectifier; a cooling fan for cooling the LCL filter; a temperature detection unit for the LCL filter; an alarm detection unit for detecting an alarm state when a temperature detection value is a predetermined value or more; a time measurement unit for measuring elapsed time from a start of a normal operation of the PWM rectifier; and a protection unit which determines, in accordance with the elapsed time, an alarm generation cause whether the alarm state is generated due to a reverse connection of a power line of the LCL filter or due to a stop of the cooling fan when the alarm state is notified, (Continued)

and performs a protection operation in accordance with the alarm generation cause.

2 Claims, 7 Drawing Sheets

(56) References Cited

U.S. PATENT DOCUMENTS

| | | | | |
|---|---|---|---|---|
| 8,687,383 B2* | 4/2014 | Wang | ................. | H02M 7/003 |
| | | | | 363/131 |
| 8,773,870 B2* | 7/2014 | Fujita | ................. | H02M 7/219 |
| | | | | 363/132 |
| 8,824,169 B2* | 9/2014 | Wang | ................. | H02M 7/493 |
| | | | | 363/131 |
| 9,318,992 B2* | 4/2016 | Swamy | | |
| 2010/0246217 A1* | 9/2010 | Sakakibara | ............. | H02M 1/32 |
| | | | | 363/37 |
| 2013/0208517 A1* | 8/2013 | Mashal | ................. | H02M 1/12 |
| | | | | 363/40 |

OTHER PUBLICATIONS

Untranslated Notification of Reasons for Refusal mailed by JPO, Dec. 15, 2015, 2 pages.
English machine translation of Notification of Reasons for Refusal mailed by JPO, Dec. 15, 2015, 2 pages.
Untranslated Decision to Grant a Patent mailed by JPO, May 10, 2016, 3 pages.
English machine translation of Decision to Grant a Patent mailed by JPO, May 10, 2016, 3 pages.
English Translation of Abstract for Japanese Publication No. 2013138561, published Jul. 11, 2013, 1 page.
English Translation of Abstract for Japanese Publication No. 2006288161, published Oct. 19, 2006, 1 page.

* cited by examiner

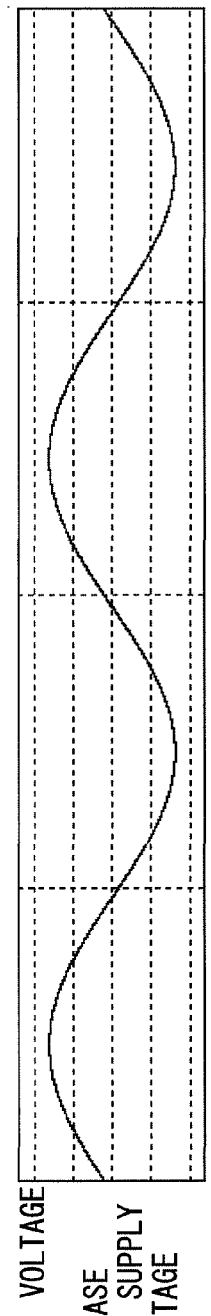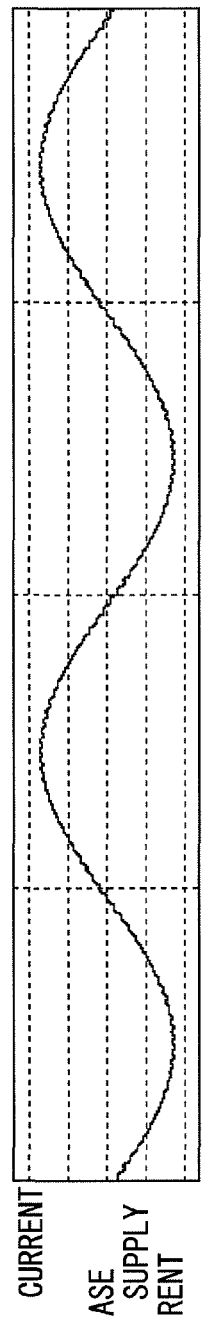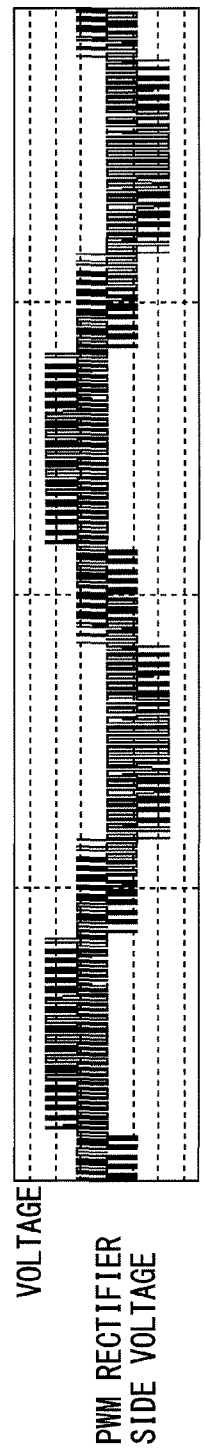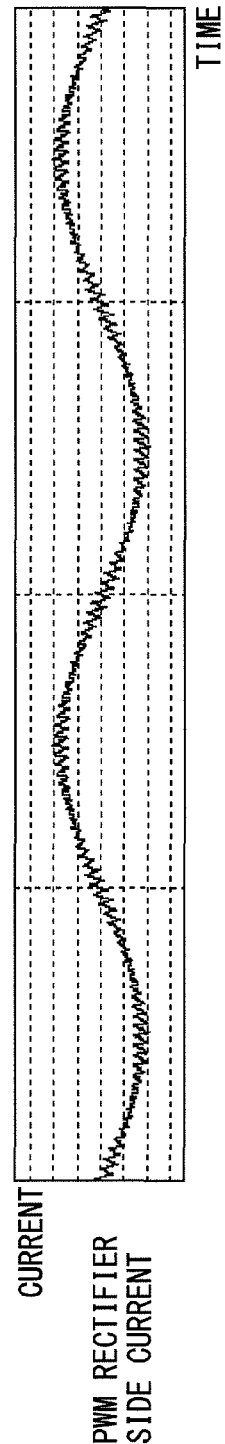
FIG. 2A (PRIOR ART) THREE-PHASE AC POWER SUPPLY SIDE VOLTAGE
FIG. 2B (PRIOR ART) THREE-PHASE AC POWER SUPPLY SIDE CURRENT
FIG. 2C (PRIOR ART) PWM RECTIFIER SIDE VOLTAGE
FIG. 2D (PRIOR ART) PWM RECTIFIER SIDE CURRENT

NORMAL CONNECTION

REVERSE CONNECTION

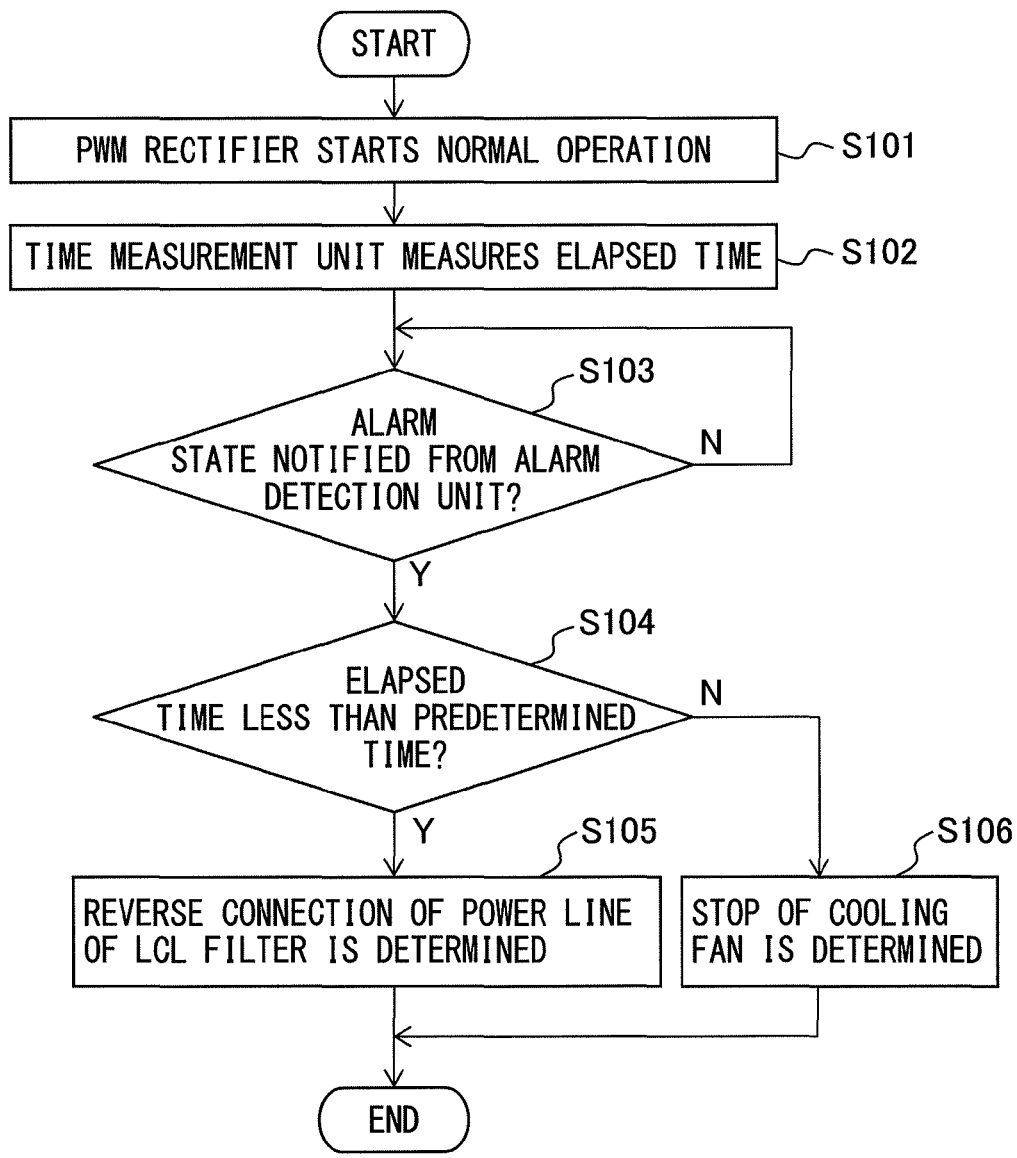

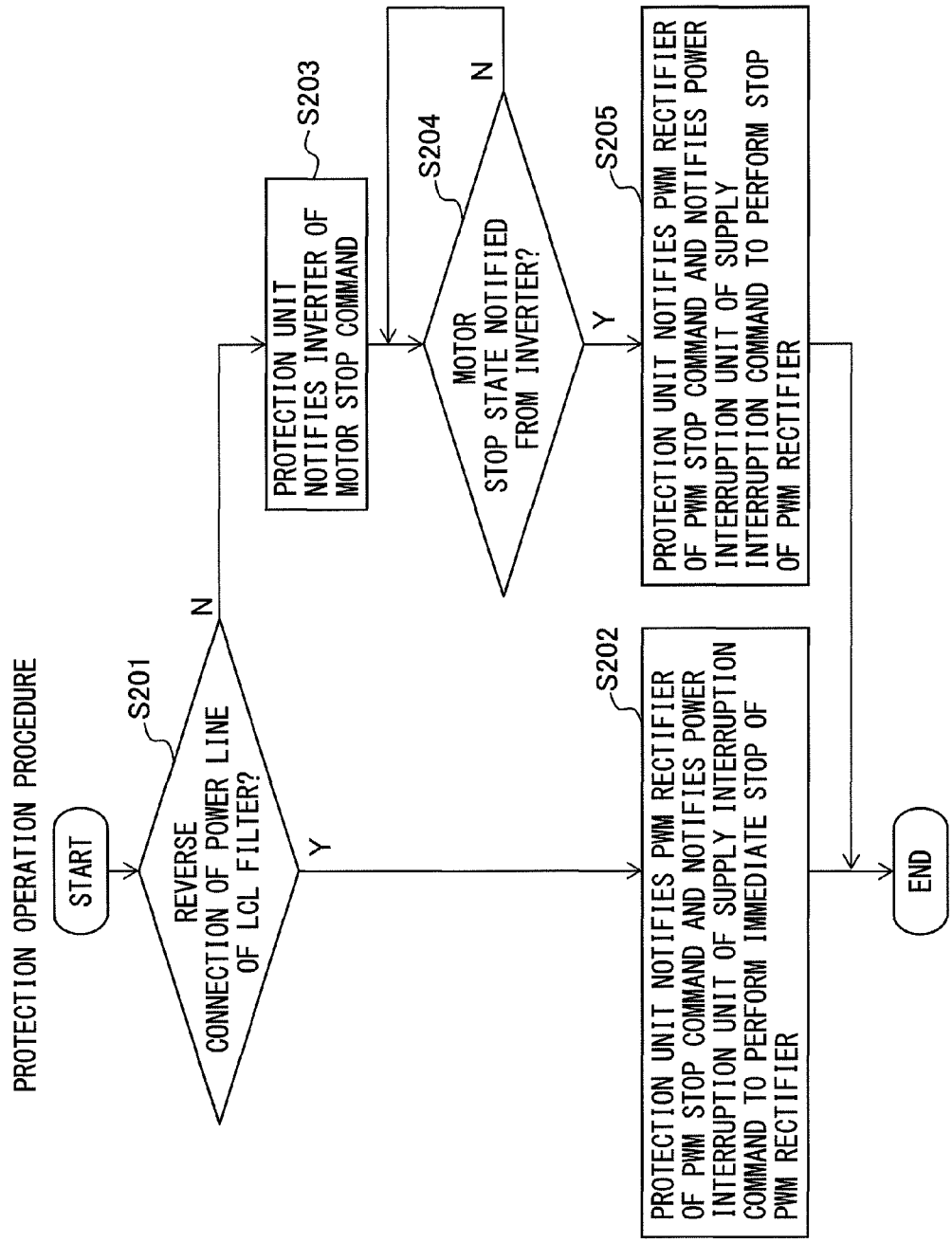

MOTOR CONTROL APPARATUS HAVING FUNCTION FOR PROTECTING LCL FILTER

BACKGROUND OF THE INVENTION

1. Field of the Invention

The present invention relates to a motor control apparatus, and more particularly to a motor control apparatus having a function for protecting LCL filter.

2. Description of the Related Art

In a motor control apparatus which drives a motor of a working machine, a forging machine, an injection molding machine, an industrial machine, a robot, or the like, a rectifier which converts alternating current (AC) power of a three-phase AC power supply to direct current (DC) power and an inverter which converts the DC power that has been output by the rectifier to AC power for driving the motor are used.

Recently, a rectifier (PWM rectifiers) using pulse width modulation (PWM) has been more and more extensively employed due to demands for reducing harmonics in a power supply and a reactive power.

To perform a switching control by the PWM, the PWM rectifier as described above outputs to a path to the three-phase AC power supply a rectangular wave AC voltage including that of high frequency of several kilohertz or more. To make only a power supply frequency component out of the rectangular wave pass, a low-pass filter is commonly provided between the PWM rectifier and the three-phase AC power supply.

FIG. 1 is a configuration diagram of a conventional motor control apparatus. A conventional motor apparatus 1000 includes a PWM rectifier 110 which converts an AC power from a three-phase AC power supply 20 to a DC power and an inverter 180 which converts the DC power to an AC power for driving a motor 30. Further, an LCL filter 120 as a low-pass filter serially connecting a damping resistor 123 to a capacitor 124 and including an inductance unit A 121 and an inductance unit B 122 at one end of the damping resistor 123 is provided between the three-phase AC power supply 20 and the PWM rectifier 110. In addition, a cooling fan 130 for cooling each element of the LCL filter 120 is also usually provided.

The LCL filter 120 suppresses a ripple of a high frequency current flowing into from a PWM rectifier 110 side while reducing a volume and a cost of the LCL filter 120 so as to be usually configured commonly in such an asymmetric manner that an inductance of the inductance unit B 122 on the PWM rectifier 110 side is high and an inductance of the inductance unit A 121 on a three-phase AC power supply side is low.

Waveforms of a voltage and a current on each of the three-phase AC power supply 20 side and the PWM rectifier 110 side of the LCL filter 120 are illustrated in FIGS. 2A-2D. FIG. 2A is a graph illustrating a temporal change of a voltage on the three-phase AC power supply side, FIG. 2B is a graph illustrating a temporal change of a current on the three-phase AC power supply side, FIG. 2C is a graph illustrating a temporal change of a voltage on the PWM rectifier side, and FIG. 2D is a graph illustrating a temporal change of a current on the PWM rectifier side.

When a power line of the LCL filter 120 having an asymmetric configuration is connected in a manner reverse to that as illustrated in FIG. 1, in other words, the inductance unit A 121 having a low inductance is connected on the PWM rectifier 110 side and the inductance unit B 122 having a high inductance is connected on the three-phase AC power supply 20 side, the ripple of a high frequency current flowing into from the PWM rectifier 110 side fails to be sufficiently suppressed so that heat generation of the LCL filter 120 increases.

In the motor control apparatus as described above, a current waveform in a case of a normal connection of the power line of the LCL filter 120 having an asymmetric configuration is illustrated in FIG. 3A, and a current waveform in a case of a reverse connection is illustrated in FIG. 3B. As illustrated in FIG. 3B, when the power line of the LCL filter is reversely connected, a current in which a ripple fails to be suppressed is found out to flow. When such a current continues to flow, noises or abnormal heat generation in a core portion of the inductance unit A 121 originally designed on the assumption that a current containing no ripple flows may occur. Along with this, damage or abnormal heat generation in the damping resistor 123 and the capacitor 124 into each of which the ripple flows may occur as well.

Since a temperature sharply increases in this case, stopping an operation of the PWM rectifier as soon as possible is to be performed. Conventionally, in this regard, a temperature detection unit for detecting a temperature of an element in an LCL filter is provided to detect abnormality of the LCL filter (for example, Japanese Laid-open Patent Publication No. 2013-246683A). FIG. 4 is a configuration diagram of a motor control apparatus 2000 which is another example of the conventional motor control apparatus. As illustrated in FIG. 4, the LCL filter 120 serially connects the damping resistor 123 to the capacitor 124 and includes the inductance unit A 121 and the inductance unit B 122 at one end of the damping resistor 123. A temperature sensor 125 is disposed, for example, in the vicinity of the damping resistor 123, and outputs information on a detected temperature to a temperature detection unit 140. A temperature detection result detected by the temperature detection unit 140 is transmitted to a determination unit 150, and the determination unit 150 controls the PWM rectifier 110 on the basis of the temperature detection result. For example, a temperature detected by the temperature detection unit 140 exceeds a predetermined value (or a temperature at a normal time which has been stored), the operation of the PWM rectifier 110 is stopped, and protection of the LCL filter 120 is performed.

In such a manner, conventionally, temperature information of the LCL filter is obtained, abnormality is detected when a temperature is at a predetermined value or more, and the operation of the PWM rectifier is stopped.

Further, as illustrated in FIG. 4, the LCL filter 120 is also usually provided with the cooling fan 130. The temperature of the LCL filter 120 increases not only in the case of the reverse connection of the power line of the LCL filter but also due to a stop of the cooling fan 130, which may result in an abnormal temperature.

An increase in temperature due to the stop of the cooling fan 130 is greater as the cooling fan 130 is more highly effective. Further, an increase in temperature due to the reverse connection of the power line of the LCL filter 120 is greater as a ratio of an inductance magnitude of the inductance unit B 122 to that of the inductance unit A 121 is larger.

When reduction in a volume and a cost of the LCL filter 120 is considered, the cooling fan 130 is usually designed in such a manner as to have a minimum performance required. Meanwhile, the ratio of an inductance magnitude of the inductance unit B 122 to that of the inductance unit A 121 is usually designed in such a manner as to be as large as possible. As the result, a loss in the case of the reverse connection of the power line of the LCL filter 120 is greater than a loss in the case of the stop of the cooling fan 130. Consequently, the increase in temperature due to the reverse connection of the power line of the LCL filter 120 is greater than the increase in temperature due to the stop of the cooling fan 130.

Thus, time from detection of a state (alarm state) in which a temperature of an element in the LCL filter 120 which is detected by the temperature detection unit 140 exceeds a predetermined value to arrival at a temperature damaging the element in the LCL filter 120 is shorter in the case of the reverse connection of the power line of the LCL filter 120 than that in the case of the stop of the cooling fan 130. When the operation of the PWM rectifier 110 continues in the case of the reverse connection of the power line of the LCL filter 120, the element in the LCL filter 120 may be highly probably damaged.

As described above, stopping the operation of the PWM rectifier 110 in the case of the reverse connection of the power line of the LCL filter 120 is to be immediately performed, whereas stopping the same in the case of the stop of the cooling fan 130 is not always to be immediately performed. In other words, when the element in the LCL filter 120 has an abnormal temperature due to the stop of the cooling fan 130, the increase in temperature in this case is not sharp. Thus, during such a short time as to perform a controlled stop of the motor 30, stopping the operation of the PWM rectifier 110 is not to be immediately performed. On the contrary, when the PWM rectifier 110 is immediately stopped, some hindrances (breakage of a workpiece or a tool, and the like) to processing using the motor control apparatus may highly probably occur so that an immediate stop of the PWM rectifier is desirably to be avoided as much as possible.

SUMMARY OF THE INVENTION

However, there has been a problem in the conventional motor control apparatus in that, regardless of types of causes which have caused the LCL filter to have an abnormal temperature, the PWM rectifier is immediately stopped so that some hindrances to processing using the motor control apparatus may highly probably occur.

A motor control apparatus according to embodiments of the present invention includes: a PWM rectifier which converts an AC power supplied from a three-phase AC power supply to a DC power; an LCL filter provided between the three-phase AC power supply and the PWM rectifier; a cooling fan for cooling the LCL filter; a temperature detection unit for detecting a temperature of the LCL filter; an alarm detection unit for detecting an alarm state when a temperature detection value of the temperature detection unit is a predetermined value or more; a time measurement unit for measuring elapsed time from a start of a normal operation of the PWM rectifier; and a protection unit which determines, in accordance with the elapsed time measured by the time measurement unit, an alarm generation cause whether the alarm state is generated due to a reverse connection of a power line of the LCL filter or the alarm state is generated due to a stop of the cooling fan when the alarm state is notified from the alarm detection unit, and performs a protection operation in accordance with the alarm generation cause.

BRIEF DESCRIPTION OF THE DRAWINGS

Other objects, features, and advantages of the present invention will become further apparent from the following description of embodiments of the invention taken in conjunction with the accompanying drawings. In the accompanying drawings.

FIG. 2A is a diagram illustrating a waveform of a voltage on a three-phase AC power supply side of an LCL filter;

FIG. 2B is a diagram illustrating a waveform of a current on the three-phase AC power supply side of the LCL filter;

FIG. 2C is a diagram illustrating a waveform of a voltage on a PWM rectifier side of the LCL filter;

FIG. 2D is a diagram illustrating a waveform of a current on the PWM rectifier side of the LCL filter;

FIG. 6 is a flowchart for explaining an abnormality cause determination procedure of the motor control apparatus according to another embodiment of the present invention; and FIG. 7 is a flowchart for explaining a protection operation procedure of the motor control apparatus according to still another embodiment of the present invention.

DETAILED DESCRIPTION

Hereinafter, a motor control apparatus according to the present invention will be described with reference to the accompanying drawings. However, note that the technical scope of the present invention is not limited to the embodiments thereof, but is intended to cover the invention set forth in the claims and equivalents thereof.

Figure 1:
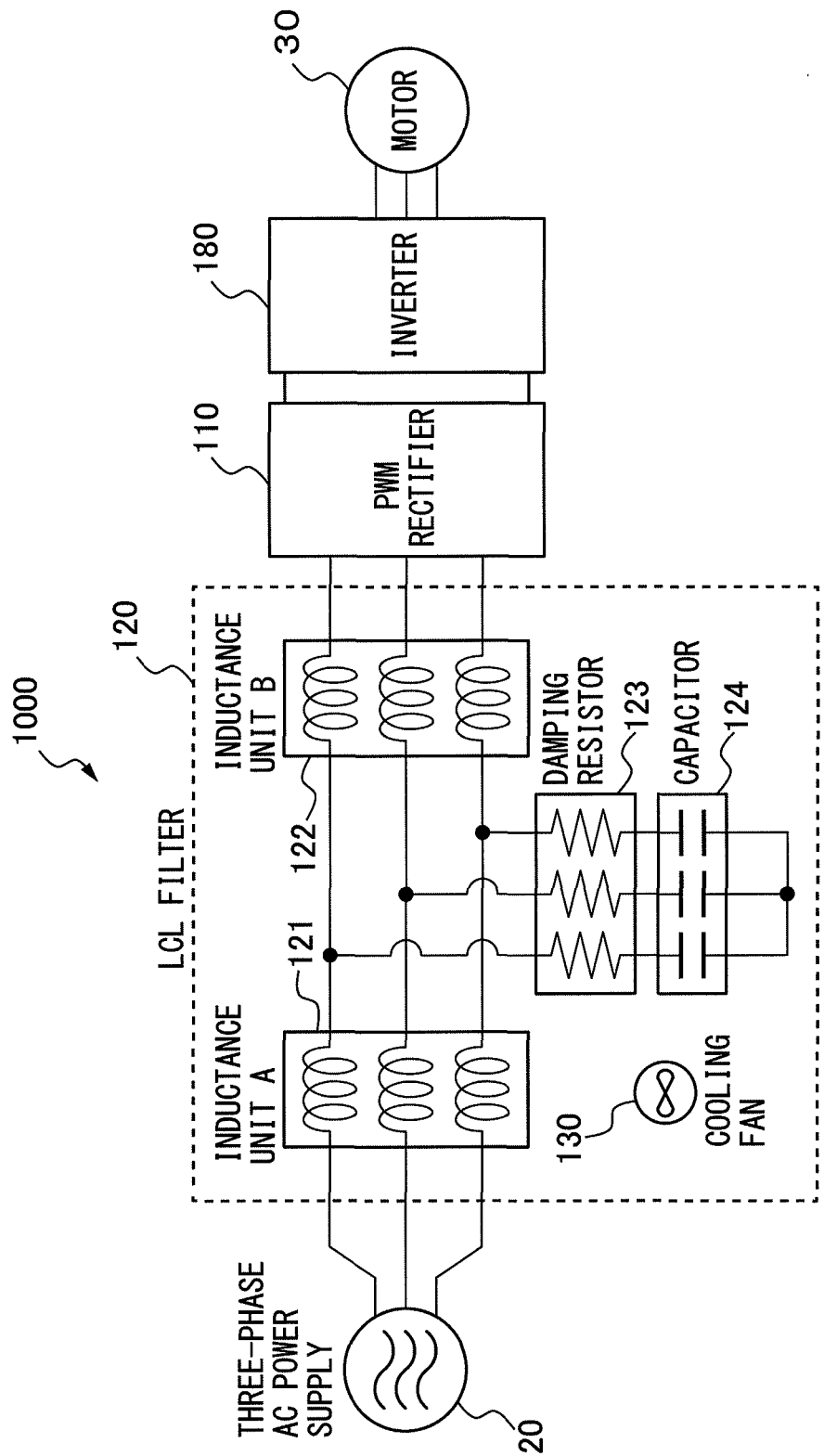
FIG. 1 is a configuration diagram of a conventional motor control apparatus.
Figure 3A:
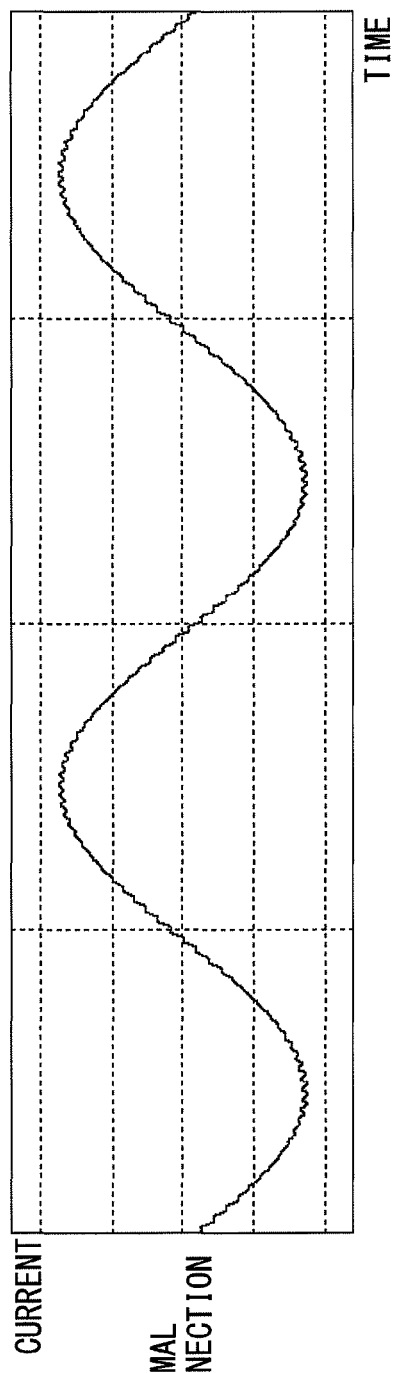
FIG. 3A is a diagram illustrating a current waveform in a case of a normal connection of a power line of the LCL filter.
Figure 3B:
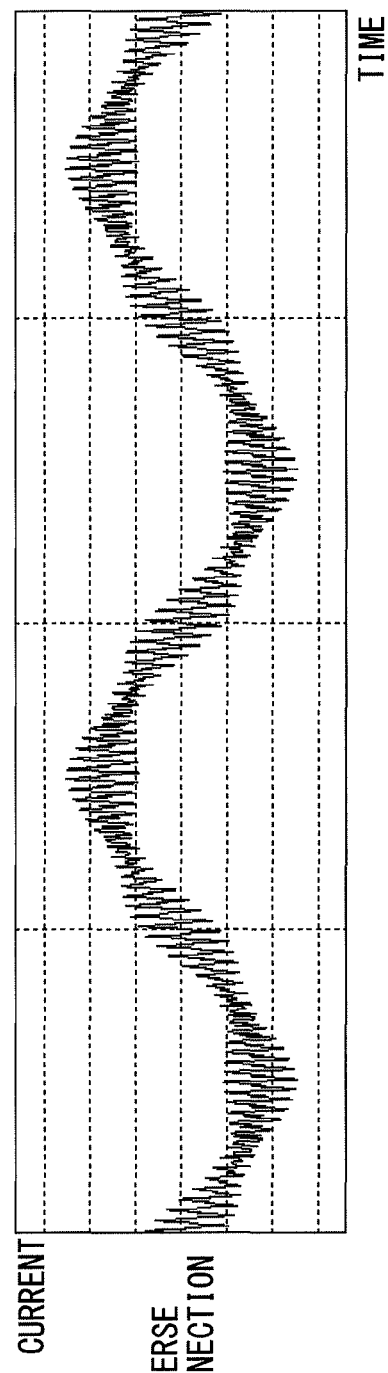
FIG. 3B is a diagram illustrating a current waveform in a case of a reverse connection of the power line of the LCL filter.
Figure 4:
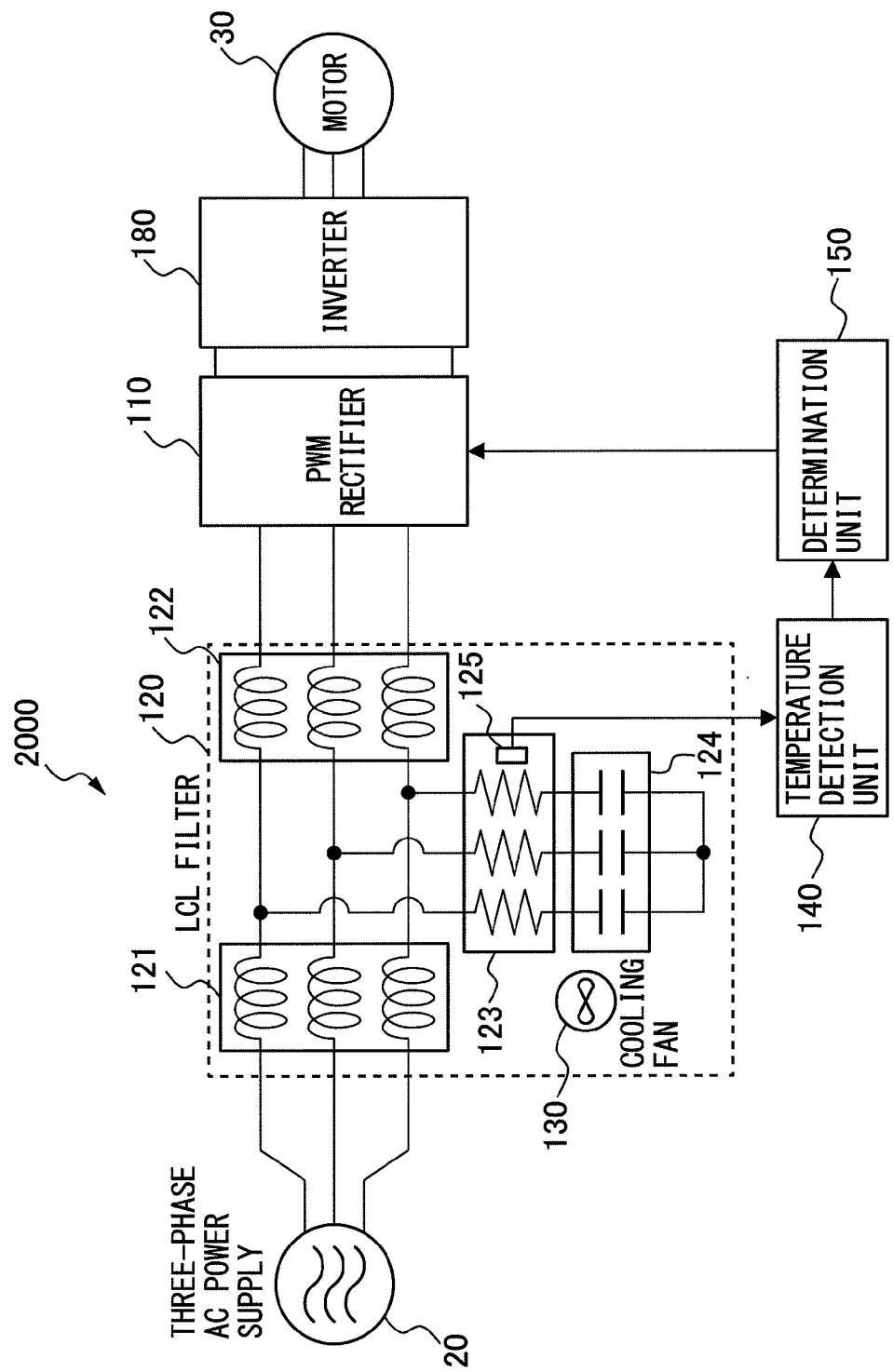
FIG. 4 is a configuration diagram according to another example of the conventional motor control apparatus.
Figure 5:
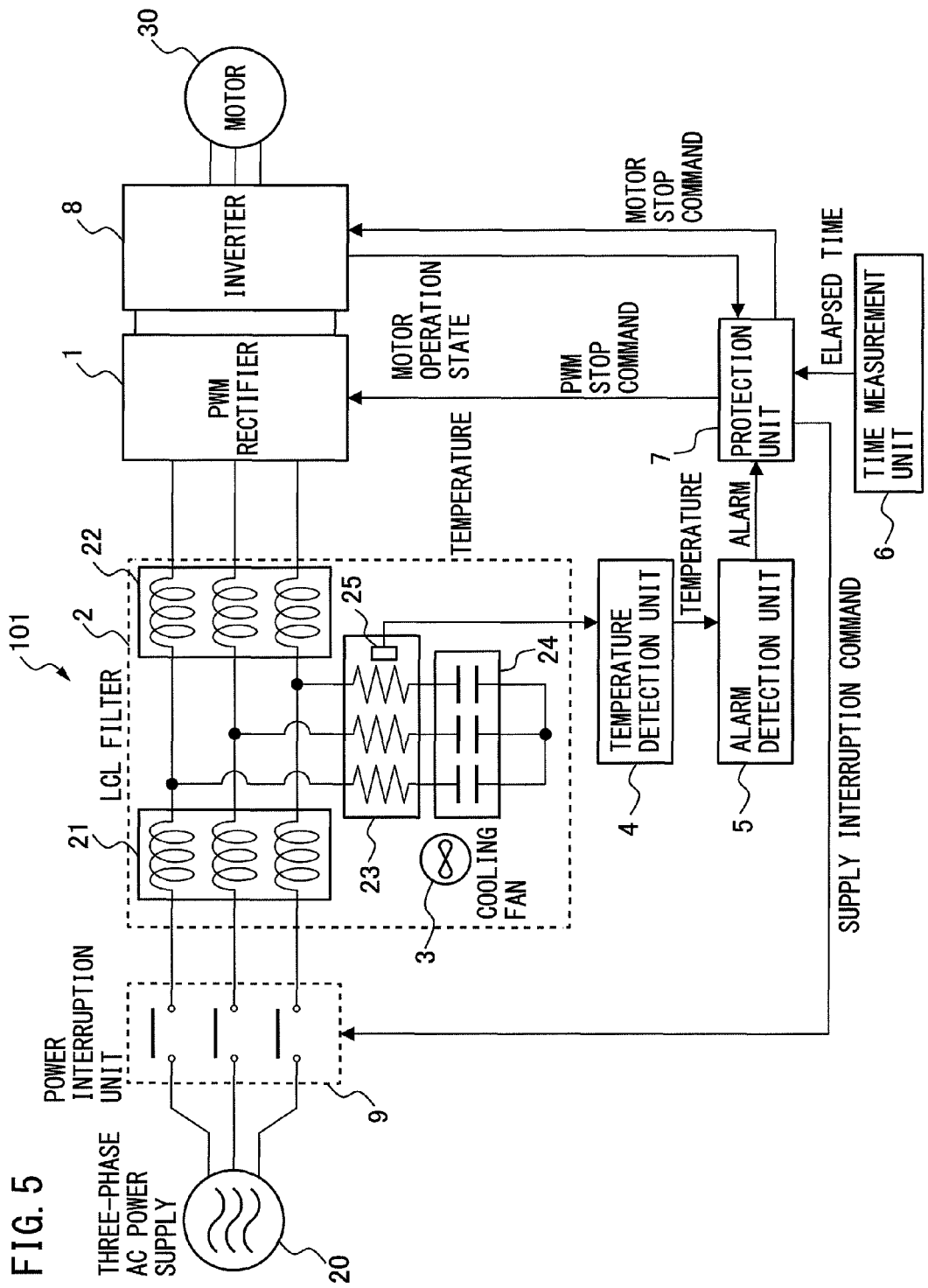
FIG. 5 is a configuration diagram of a motor control apparatus according to an embodiment of the present invention.

The motor control apparatus according to an embodiment of the present invention will be described with reference to the accompanying drawings. FIG. 5 is a configuration diagram of the motor control apparatus according to the embodiment of the present invention. A motor control apparatus 101 according to the embodiment of the present invention includes: a PWM rectifier 1 which converts an AC power supplied from a three-phase AC power supply 20 to a DC power; an LCL filter 2 provided between the three-phase AC power supply 20 and the PWM rectifier 1; a cooling fan 3 for cooling the LCL filter 2; a temperature detection unit 4 for detecting a temperature of the LCL filter 2; an alarm detection unit 5 for detecting an alarm state when a temperature detection value of the temperature detection unit 4 is a predetermined value or more; a time measurement unit 6 for measuring elapsed time from a start of a normal operation of the PWM rectifier 1; and a protection unit 7 which determines, in accordance with the elapsed time measured by the time measurement unit 6, an alarm generation cause whether the alarm state is generated due to a reverse connection of a power line of the LCL filter 2 or the alarm state is generated due to a stop of the cooling fan 3 when the alarm state is notified from the alarm detection unit 5, and performs a protection operation in accordance with the alarm generation cause.

The motor control apparatus 101 according to the embodiment of the present invention further includes: an inverter 8 which is connected to a DC link that is a DC side of the PWM rectifier 1 and performs an alternate power conversion of a DC power in the DC link and an alternate current power that is a drive power or a regenerative power of a motor; and a power interruption unit 9 provided between the three-phase AC power supply 20 and the LCL filter 2, in which the protection unit 7 is notified of an alarm state from the alarm detection unit 5, and when elapsed time measured by the time measurement unit 6 is less than a predetermined time, the protection unit 7 determines that the power line of the LCL filter 2 has been reversely connected, and notifies the PWM rectifier 1 of a PWM stop command and notifies the power interruption unit 9 of a supply interruption command, and is notified of an alarm state from the alarm detection unit 5, and when elapsed time measured by the time measurement unit 6 is equal to or more than the predetermined time, the protection unit 7 determines that the cooling fan 3 has stopped, and notifies the inverter 8 of a motor stop command, and then, when the motor 30 stops, the protection unit 7 notifies the PWM rectifier 1 of a PWM stop command and notifies the power interruption unit 9 of a supply interruption command.

The temperature detection unit 4 detects a temperature of an element of the LCL filter 2 by using a temperature sensor 25. Specifically, the temperature detection unit 4 detects a temperature of any of an inductance unit A 21, an inductance unit B 22, a damping resistor 23, or a capacitor 24 in each of which the temperature greatly increases in a case of the reverse connection of the power line of the LCL filter 2, or a temperature in the vicinity thereof. In FIG. 5, an embodiment in which the temperature sensor 25 is disposed in the vicinity of the damping resistor 23, which is not limitative.

When a temperature detection value detected by the temperature detection unit 4 is a predetermined value or more, the alarm detection unit 5 notifies the protection unit 7 of an alarm state. Note that as the predetermined value, a value in accordance with a withstand capacity of the element of the LCL filter 2 is set.

The time measurement unit 6 measures elapsed time from a start of a normal operation of the PWM rectifier 1.

A high frequency current due to PWM flows in the LCL filter 2 after the PWM rectifier 1 starts the normal operation. Thus, when notified of an alarm state from the alarm detection unit 5, the protection unit 7 classifies a cause of abnormality of the LCL filter 2 in accordance with the elapsed time.

As described above, since an increase in temperature due to the reverse connection of the power line of the LCL filter 2 is greater than an increase in temperature due to a stop of the cooling fan 3, the cause of abnormality of the temperature of the element in the LCL filter 2 is determined in the following manner:

when the alarm detection unit 5 notifies an alarm state and the elapsed time is less than a predetermined time, the cause is the reverse connection of the power line of the LCL filter 2; and when the alarm detection unit 5 notifies an alarm state and the elapsed time is equal to or more than the predetermined time, the cause is the stop of the cooling fan 3.

The predetermined time is set in accordance with a ratio of an inductance magnitude of the inductance unit B 22 to that of the inductance unit A 21, and a performance of the cooling fan 3.

In the above manner, when determining the cause of abnormality of the temperature of the element in the LCL filter 2, the protection unit 7 performs a protection operation as described below.

When the cause of abnormality of the temperature of the element in the LCL filter 2 is the reverse connection of the power line of the LCL filter 2, the protection unit 7 notifies the PWM rectifier 1 of a PWM stop command and notifies the power interruption unit 9 of a supply interruption command to immediately stop the PWM rectifier 1.

On the other hand, when the cause of abnormality of the temperature of the element in the LCL filter 2 is the stop of the cooling fan 3, the protection unit notifies the inverter 8 of a motor stop command. Then, when a motor stop state is notified from the inverter 8, the PWM rectifier 1 is notified of the PWM stop command and the power interruption unit 9 is notified of a supply interruption command to stop the PWM rectifier 1.

A protection operation is performed by using the motor control apparatus of the present invention, thereby enabling a controlled stop of the motor in the case of the stop of the cooling fan which does not necessitate an immediate stop of the PWM rectifier 1, and in this case, there is no more possibility of occurrence of hindrances to processing using the motor control apparatus.

Next, a procedure of determining an abnormality cause of the LCL filter by using the motor control apparatus according to another embodiment of the present invention will be described with reference to a flowchart illustrated in FIG. 6. First, in a step S101, the PWM rectifier 1 performs a normal operation to start the motor 30.

Next, in a step S102, the time measurement unit 6 measures elapsed time from a start of the normal operation of the PWM rectifier 1. The elapsed time measured by the time measurement unit 6 is notified to the protection unit 7.

Next, in a step S103, whether or not an alarm state is notified from the alarm detection unit 5 to the protection unit 7 is determined. When an alarm state is not notified from the alarm detection unit 5 to the protection unit 7, it can be determined that a temperature detection result of the temperature sensor 25 disposed in the LCL filter 2 from the temperature detection unit 4 indicates that a temperature of an element in the LCL filter 2 is not abnormal. In this case, returning to the step S103 is performed, and whether or not an alarm state is notified from the alarm detection unit 5 to the protection unit 7 is determined, thereby continuously monitoring a temperature of an element in the LCL filter 2.

On the other hand, when an alarm state is notified from the alarm detection unit 5 to the protection unit 7, it can be determined that a temperature detection result of the temperature sensor 25 disposed in the LCL filter 2 from the temperature detection unit 4 indicates that a temperature of an element in the LCL filter 2 is abnormal. In this case, a cause of an abnormal temperature of the element in the LCL filter 2 is classified whether the cause is the reverse connection of the power line of the LCL filter 2, or the stop of the cooling fan 3.

Then, in a step S104, whether or not the elapsed time from the start of the normal operation of the PWM rectifier 1 is less than a predetermined time. When the elapsed time from the start of the normal operation of the PWM rectifier 1 is less than the predetermined time, it is determined in a step S105 that the cause of the abnormal temperature of the element in the LCL filter 2 is the reverse connection of the power line of the LCL filter 2.

On the other hand, when the elapsed time from the start of the normal operation of the PWM rectifier 1 is equal to or more than the predetermined time, it is determined in a step S106 that the cause of the abnormal temperature of the element in the LCL filter 2 is the stop of the cooling fan 3.

In the above manner, the cause of the abnormal temperature of the element in the LCL filter 2 is determined, and then, on the basis of the determination result, the protection unit 7 performs the protection operation of the LCL filter 2.

Next, a procedure of the protection operation of the LCL filter 2 by using the motor control apparatus according to still another embodiment of the present invention will be described with reference to a flowchart illustrated in FIG. 7. First, in a step S201, whether or not a cause of abnormality of a temperature of an element in the LCL filter 2 is the reverse connection of the power line of the LCL filter 2 is determined. A determination procedure is as described above.

When the cause of the abnormal temperature of the element in the LCL filter 2 is the reverse connection of the power line of the LCL filter 2, in a step S202, the protection unit 7 notifies the PWM rectifier 1 of a PWM stop command and notifies the power interruption unit 9 of a supply interruption command to immediately stop the PWM rectifier 1.

On the other hand, when the cause of the abnormal temperature of the element in the LCL filter 2 is not the reverse connection of the power line of the LCL filter 2, in other words, the cause is the stop of the cooling fan 3, in a step S203, the protection unit 7 notifies the inverter 8 of a motor stop command.

Next, in a step S204, whether or not the protection unit 7 is notified of a motor stop state from the inverter 8 is determined. When not notified of a motor stop state from the inverter 8, the protection unit 7 awaits notification of a motor stop state from the inverter 8.

On the other hand, when notified of a motor stop state from the inverter 8, the protection unit 7 notifies the PWM rectifier 1 of a PWM stop command and notifies the power interruption unit 9 of a supply interruption command to stop the PWM rectifier 1.

As described above, according to the motor control apparatus according to the embodiments of the present invention, a cause of an abnormal temperature of the LCL filter is determined in accordance with elapsed time from the start of the normal operation of the PWM rectifier, and in the case of the stop of the cooling fan which does not necessitate an immediate stop of an operation of the PWM rectifier, a controlled stop of the motor is performed and then a stop of an PWM operation and a power interruption are performed. Thus, hindrances to processing using the motor control apparatus can be suppressed to a minimum and protection of the LCL filter can be also performed.

As described above, according to the motor control apparatus according to the embodiments of the present invention, hindrances to processing using the motor control apparatus following an immediate stop of the PWM rectifier can be suppressed to a minimum and protection of the LCL filter can be performed.

What is claimed is:

1. A motor control apparatus comprising:
a PWM rectifier which converts AC power supplied from a three-phase AC power supply to DC power;
an LCL filter provided between the three-phase AC power supply and the PWM rectifier;
a cooling fan configured to cool the LCL filter;
a temperature detection unit configured to detect a temperature of the LCL filter;
an alarm detection unit configured to detect an alarm state when a temperature detection value of the temperature detection unit is a predetermined value or more;
a time measurement unit configured to measure elapsed time from a start of a normal operation of the PWM rectifier; and
a protection unit configured to determine, in accordance with the elapsed time measured by the time measurement unit, an alarm generation cause whether the alarm state is generated due to a reverse connection of a power line of the LCL filter or the alarm state is generated due to a stop of the cooling fan when the alarm state is notified from the alarm detection unit, and performs a protection operation in accordance with the alarm generation cause,
wherein the protection unit determines that the power line of the LCL filter has been reversely connected when the alarm state is notified from the alarm detection unit and the elapsed time measured by the time measurement unit is less than the predetermined time, and
wherein the protection unit determines that the cooling fan has stopped when the alarm state is notified from the alarm detection unit and the elapsed time measured by the time measurement unit is equal to or more than the predetermined time.

2. A motor control apparatus comprising:
a PWM rectifier which converts AC power supplied from a three-phase AC power supply to DC power;
an LCL filter provided between the three-phase AC power supply and the PWM rectifier;
a cooling fan configured to cool the LCL filter;
a temperature detection unit configured to detect a temperature of the LCL filter;
an alarm detection unit configured to detect an alarm state when a temperature detection value of the temperature detection unit is a predetermined value or more;
a time measurement unit configured to measure elapsed time from a start of a normal operation of the PWM rectifier; and
a protection unit configured to determine, in accordance with the elapsed time measured by the time measurement unit, an alarm generation cause whether the alarm state is generated due to a reverse connection of a power line of the LCL filter or the alarm state is generated due to a stop of the cooling fan when the alarm state is notified from the alarm detection unit, and performs a protection operation in accordance with the alarm generation cause, further comprising:
an inverter which is connected to a DC link that is a DC side of the PWM rectifier and performs an alternate power conversion of a DC power in the DC link and an alternate current power that is a drive power or a regenerative power of a motor; and
a power interruption unit provided between the three-phase AC power supply and the LCL filter,
wherein the protection unit is notified of an alarm state from the alarm detection unit, and when elapsed time measured by the time measurement unit is less than a predetermined time, the protection unit determines that the power line of the LCL filter has been reversely connected,
wherein the protection unit notifies the PWM rectifier of a PWM stop command and notifies the power interruption unit of a supply interruption command,
wherein the protection unit is notified of an alarm state from the alarm detection unit, and when elapsed time measured by the time measurement unit is equal to or more than the predetermined time, the protection unit determines that the cooling fan has stopped, and wherein the protection unit notifies the inverter of a motor stop command, and then, when the motor stops, the protection unit notifies the PWM rectifier of a PWM stop command and notifies the power interruption unit of a supply interruption command.

\* \* \* \* \*